US007856520B2

United States Patent
Ranade et al.

(10) Patent No.: US 7,856,520 B2
(45) Date of Patent: Dec. 21, 2010

(54) CONTROL BUS FOR CONNECTION OF ELECTRONIC DEVICES

(75) Inventors: Shrikant Ranade, Campbell, CA (US); Alexander Peysakhovich, San Jose, CA (US); Hyuck Jae Lee, San Francisco, CA (US); Hoon Choi, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 110 days.

(21) Appl. No.: 11/969,852

(22) Filed: Jan. 4, 2008

(65) Prior Publication Data

US 2009/0177820 A1 Jul. 9, 2009

(51) Int. Cl.
*G06F 13/42* (2006.01)
*G06F 13/00* (2006.01)
*G06F 13/368* (2006.01)

(52) U.S. Cl. .................. 710/106; 710/105; 710/107; 710/119

(58) Field of Classification Search .............. 710/2, 710/8, 11, 14, 300, 105, 106, 107, 110, 119, 710/306, 315
See application file for complete search history.

(56) References Cited

U.S. PATENT DOCUMENTS

| 5,210,846 A | * | 5/1993 | Lee .......................... 710/115 |
| 5,239,732 A | * | 8/1993 | Steven ....................... 24/575.1 |
| 5,579,299 A | * | 11/1996 | Halter et al. ................ 370/212 |
| 5,729,547 A | * | 3/1998 | Dute .......................... 370/447 |
| 6,112,275 A | * | 8/2000 | Curry et al. .................. 711/100 |
| 6,532,506 B1 | * | 3/2003 | Dunstan et al. .............. 710/100 |
| 6,697,897 B1 | * | 2/2004 | Friel et al. .................. 710/105 |
| 7,181,557 B1 | * | 2/2007 | Falik et al. .................. 710/110 |
| 7,187,307 B1 | | 3/2007 | Schmidt et al. |
| 2004/0015570 A1 | * | 1/2004 | Daum et al. ................ 709/220 |
| 2004/0218599 A1 | * | 11/2004 | Kobayashi .................. 370/389 |

(Continued)

FOREIGN PATENT DOCUMENTS

EP 1473701 11/2004

(Continued)

OTHER PUBLICATIONS

"Advanced 1-Wire Network Driver". Application Note 244. Maxim Integrated Products. May 30, 2003. pp. 1-13.*

(Continued)

*Primary Examiner*—Thomas J Cleary
(74) *Attorney, Agent, or Firm*—Blakely Sokoloff Taylor & Zafman (57) ABSTRACT

A method and apparatus for a control bus for connection of electronic devices. An embodiment of a method includes coupling a transmitting device to a receiving device, including connecting a control bus between the transmitting device and the receiving device, with the control bus being a bi-directional, single-line bus. The method further includes obtaining control of the control bus for either the transmitting device or the receiving device, with the device obtaining control becoming an initiator and the other device becoming a follower. One or more control signals are converted to one or more data packets, with each of the one or more control signals representing one of multiple different types of control signals. The generated data packets are transmitted from the initiator to the follower via the control bus.

25 Claims, 9 Drawing Sheets

U.S. PATENT DOCUMENTS

| | | | |
|---|---|---|---|
| 2005/0185720 A1* | 8/2005 | Kwok | 375/257 |
| 2007/0073449 A1* | 3/2007 | Kraemer et al. | 701/1 |
| 2007/0083692 A1 | 4/2007 | Liu et al. | |
| 2007/0201492 A1 | 8/2007 | Kobayashi | |
| 2007/0279408 A1 | 12/2007 | Zheng et al. | |
| 2007/0286246 A1 | 12/2007 | Kobayashi | |
| 2008/0315943 A1* | 12/2008 | Underhill | 327/552 |
| 2009/0177818 A1* | 7/2009 | Shim et al. | 710/100 |

FOREIGN PATENT DOCUMENTS

| | | |
|---|---|---|
| EP | 1519581 | 3/2005 |
| GB | 2425696 A  * | 11/2006 |

OTHER PUBLICATIONS

"Lindy announce Mini HDMI adapter for camcorders and notebooks". HDTV UK. Online Sep. 28, 2007. Retrieved from Internet Sep. 23, 2009. <http://www.hdtvuk.tv/2007/09/lindy_announce_1.html>.*

"Guidelines for Reliable 1-Wire Networks". Application Note 148. Dallas Semiconductor/Maxim. Jun. 19, 2002. pp. 1-21.*

"8029P038PCT ISRWO Mailed Mar. 9, 2009 for PCT/US2009/085288", (Mar. 9, 2009), Whole Document.

Maxim, *1-Wire Products Design Guide*, 4$^{th}$ Edition, pp. 1-8, Feb. 2009. www.maxim-ic.com/yes.

O'Donnell, B., *White Paper HDMI™: The Digital Display Link*, IDC Analyze the Future, pp. 1-21, Dec. 2006, Framingham, MA.

Hitachi, Ltd. et al., *High-Definition Multimedia Interface: Specification Version 1.3*, pp. 1-231, Jun. 22, 2006.

Maxim, *1-Wire® Extended Network Standard*, pp. 1-5, Oct. 26, 2006. www.maxim-ic.com/an3925.

Maxim, *Choosing the Right 1-Wire® Master for Embedded Applications*, pp. 1-10, May 27, 2008. www.maxim-ic.com/an4206.

Maxim, *Overview of 1-Wire® Technology and Its Use*, pp. 1-11, Jun. 19, 2008. www.maxim-ic.com/an1796.

Maxim, *DS 1994 4Kb Plus Time Memory iButton®*, pp. 1-23, Nov. 2009. www.maxim-ic.com.

Maxim, *DS 2404 EconoRAM Time Chip*, pp. 1-29, Jan. 22, 2007. www.maxim-ic.com.

USPTO, Non-Final Office Action for U.S. Appl. No. 11/969,865 mailed Oct. 28, 2009.

USPTO, Notice of Allowance for U.S. Appl. No. 11/969,865 mailed May 11, 2010.

"8029P037PCT ISR and WO Mailed Mar. 25, 2009 for PCT/US2008/085287", Whole Document.

"8029P039PCT ISR and WO Mailed Mar. 13, 2009 for PCT/US2008/086879", Whole Document.

"High-Definition Multimedia Interface Specification Version 1.3", Internet Citation XP002391813-http://www.hdmi.org/download/HDMI_Spec_1.3_GM1.pdf, (retrieved on Jul. 26, 2006), Whole Document.

"High-Definition Multimedia Interface Specification Version 1.3a", Nov. 10, 2006, cover page and p. 1 of 156 pages only.

"On-The-Go Supplement to the USB 2.0 Specification Revision 1.0", Dec. 18, 2001; cover page, pp. 1, 37-41, and 47-49.

* cited by examiner

| PIN | HDMI-M Signal assignment | Standard HDMI Signal assignment |
| --- | --- | --- |
| 1 | NC | TMDS Data2+ |
| 2 | NC | TMDS Data2 Shield |
| 3 | NC | TMDS Data2- |
| 4 | NC | TMDS Data1+ |
| 5 | NC | TMDS Data1 Shield |
| 6 | NC | TMDS Data1- |
| 7 | TMDS Data+ | TMDS Data0+ |
| 8 | TMDS Data Shield | TMDS Data0 Shield |
| 9 | TMDS Data- | TMDS Data0- |
| 10 | TMDS Clock+ | TMDS Clock+ |
| 11 | TMDS Clock Shield | TMDS Clock Shield |
| 12 | TMDS Clock- | TMDS Clock- |
| 13 | NC | CEC |
| 14 | 5V power from RX | Reserved (NC) |
| 15 | USB Data+ | DDC SCL |
| 16 | USB Data- | DDC SDA |
| 17 | GND | DDC/CEC GND |
| 18 | NC | +5V power from TX |
| 19 | Ctrl Bus | Hot Plug Detect |

UShttps://patents.google.com/patent/US7856520

CONTROL BUS FOR CONNECTION OF ELECTRONIC DEVICES

TECHNICAL FIELD

Embodiments of the invention generally relate to the field of electronic devices and, more particularly, to a method and apparatus for a control bus for connection of electronic devices.

BACKGROUND

Multiple electronic devices are increasingly connected together to communication date. In one example, entertainment and multi-media devices may be interconnected to transfer or share digital information. The connection of such devices generally requires some form of standard bus or interface to allow the devices to easily connect communicate with each other.

In one example, the HDMI™ (High-Definition Multimedia Interface) provides an interface that allows for the transfer of uncompressed digital high-definition video and audio, together with associated control signals. (HDMI is a trademark of HDMI Licensing, LLC) HDMI includes the High-Definition Multimedia Specification 1.3 (Hitachi, Ltd., Matsushita Electric Industrial Co., Ltd., Philips Consumer Electronics, International B.V., Silicon Image, Inc., Sony Corporation, Thomson Inc., and Toshiba Corporation) (Jun. 22, 2006), as well as earlier versions of HDMI. Multimedia devices may include any devices capable of providing, storing, or displaying multimedia data, including television monitors, cable and satellite set-top boxes, video players, including DVD (Digital Versatile Disk), HD (High-Definition) DVD, and Blu-Ray players, audio players, digital video recorders, and other similar devices.

However, the use of any interface may be affected by physical size of devices. For example, media devices may be portable or handheld. The use of an interface designed for a standard device may be difficult for smaller devices. In addition, there is physical limit on how many connections may be reasonably added to a smaller device. The addition of an interface in addition to, for example, a USB (Universal Serial Bus) connection to a device may result in excessive connections to the device, thus making it less likely that manufacturers will includes such an interface in manufactured device.

SUMMARY

A method and apparatus are provided for a control bus for connection of electronic devices.

In a first aspect of the invention, a method includes coupling a transmitting device to a receiving device. The coupling of the devices includes connecting a control bus between the transmitting device and the receiving device, the control bus being a bidirectional, single-line bus. Control of the control bus is obtained for either the transmitting device or the receiving device, with the device obtaining control becoming an initiator and the other device becoming a follower. One or more control signals are converted to one or more data packets, with each of the one or more control signals representing one of multiple different types of control signals. The generated data packets are transmitted from the initiator to the follower via the control bus.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a control bus for connection of electronic devices.

As used herein:

"Mobile device" means any mobile electronic device. The term "mobile device" includes, but is not limited to, a cellular telephone, smartphone, PDA (personal digital device), MP3 or other format music player, digital camera, video recorder, digital storage device, and other similar devices.

In some embodiments, a system provides an interface to connect a mobile device to other devices. In some embodiments, a mobile device utilizes a modified protocol to allow connection with other devices, which may utilize a standard protocol. In some embodiments, a connection between a mobile device and another device includes the merging of multiple control signals on to a single bus, where such control signals would have utilized multiple buses under the standard protocol. In some embodiments, a mobile transmitting device utilizing a modified protocol may be connectable with a dual mode receiving device, wherein the receiving device may receive data from either the mobile transmitting device or a standard transmitting device.

In a particular embodiment, data being transferred between devices may be multimedia data and associated commands, including HDMI data and commands. For example, a mobile device containing high-definition video data and related commands may be connected to a standard HDMI device (such as, for example, a television monitor). However, embodiments of the invention are not limited to any particular type of data or device. As used herein, HDMI-M is utilized here to indicate a mobile device utilizing a modified protocol. The HDMI-M device may include the use of USB (Universal Serial Bus) protocol data, utilizing USB-OTG (USB On-The-Go, a standard for portable devices that allows dual-mode operation in which a device may be connected to a personal computer or to another portable device). HDMI-E is utilized here to designate a dual-mode device that can be interfaced with a modified protocol mobile device or a standard protocol device.

In some embodiments, a link layer describes a method and protocol for sending and receiving data between two devices using a bi-directional, 1-bit (single wire) data line. In some embodiments, a translation layer will describe how standard control protocols may be mapped to the 1-bit line. In a particular embodiment in which an HDMI system is involved, the translation layer describes how CEC (Consumer Electronics Control), DDC I2C (Display Data Channel), and any other protocols may be mapped to the 1-bit data line. In HDMI, DDC is used for configuration and status exchange between a single source (a "source" being a device providing HDMI output) and a single "sink" (a sink being a device receiving an HDMI input). Further, CEC is an optional protocol that provides high-level control functions between all of the various audiovisual products in a user's environment. In an embodiment, a "private channel" of the control bus may be used to carry out housekeeping tasks between the transmitter and the receiver. The private channel also used as a communications channel between the transmitter and receiver firmware.

In some embodiments, the link layer is a point-to-point bi-directional bus using "bi-phase mark encoding" to transmit bits. In bi-phase mark encoding, each bit of data is represented by two logical states. The first state of a symbol is always different from the last state of the previous symbol. Further, the last state of a symbol is identical to the first state if the bit to the transmitted is a logical '0', and the last state of a symbol is different than to the first state if the bit is a logical '1'. Using bi-phase mark code assists in synchronization by ensuring that at least one transition occurs on a channel for every bit of data.

In some embodiments, standard control commands and data are converted into data packets for transmission on the single bit control bus, with the data packets identifying the types of commands and data being transmitted. In some embodiments, the protocol for the control bus is byte-oriented to address the bytes of standard protocol commands and data. In an example, the byte-oriented protocol may be used to align with both DDC and CEC for HDMI, which are also byte-oriented. In some embodiments, the start of each data packet is signaled by a clock (sync) pulse, followed by 2 bits of header, 1 control bit, 8 bits of data, and 1 bit of parity. There is further 1 bit for a received ACK (acknowledge). In this example, the byte structure provides a total of 13 bit times per byte transfer, followed by an ACK. The link layer interfaces to the translation layer, which in turn interfaces to the relevant control protocols, such as, in this example, DDC and CEC state machines for HDMI operations.

In some embodiments, upon power-on, a bus control logic enters a discovery and wake-enable phase in which the logic detects its connectivity and functionality. The bus control logic may then move to an arbitration phase to gain control of the bus, which is described in more detail below. Finally, in the active phase, data may be written from the initiator (the device gaining control of the bus) to the follower (the other device in the transaction). In some embodiments, an initiator may transmit multiple packets on the control bus after gaining control of the bus. In an example, if an initiator has transmitted a packet, a subsequent data packet from the same initiator may start immediately after the ACK from the follower.

In an embodiment, an existing connection may be utilized for the single-bit control bus, with a pad for the existing use being shared with the pad for the control bus. In one embodiment, a hot plug detection pad may be shared with a single bit-control bus pad. In an embodiment, the receiver and transmitter may be switchable to allow operation over the single-bit control bus while also operating within the parameters of the standard protocol. For example, for HDMI, there is a pull-up circuit for the transmitter and a pull-down circuit for the receiver on the control bus. In an embodiment, the pull-up and pull-down circuits are switchable (providing a choice between pull-up (or pull-down) and off) to support applications outside of the HDMI specification, such as the connection of a mobile device.

In some embodiments, a local oscillator is utilized to provide the necessary time base for either side of the bus, rather than utilizing a clock signal transmission. In an embodiment, a control bus implementation accommodates a broad range of time variation (such as, for example, 2× variation) in the local oscillator frequency, which may result from PVT (process, voltage, and temperature) variations in electronic circuits. Because multiple types of control signals are merged onto a single bus, a faster clock time is required. In a particular example, a local oscillator is divided down to provide a 1 us (1 MHz) timebase for the bit time for the transport of HDMI data. In an embodiment, this timebase is accurate to within ±40% in order to maintain the frequency variation within the 2× variation range.

In an embodiment, the inclusion of a mobile device provides two possible modes of operation, and each may utilize a different cable. In a first case, a mobile transmitting device is connected to a standard protocol, dual-mode receiving device. The receiving device thus would include a standard cable input that is adapted for use with the mobile device. In a second case, a mobile transmitting device may be coupled with another mobile device.

In a first example, when an HDMI-M transmitter and an HDMI-E dual-mode receiver are connected via a Type-M to Type-E cable (indicating a cable from an HDMI-M transmitter to an HDMI-E receiver), then both HDMI and USB protocols can be operational. In this example, the control bus initiates discovery on the receiver side, followed by hot plug detect on the transmitter side. The control bus is used to provide an ID assignment to the USB-OTG PHY (physical layer) on the transmitter side of the connection.

In a second example in which two HDMI-M devices are connected together, this may be done via a Type-M to Type-M cable (indicating a cable from a first HDMI-M device, a transmitting device, to a second HDMI-M device, a receiving device). In this instance, only the USB-OTG connection is operational. The control bus is not connected between the devices, and is only used to provide an ID assignment to the USB-OTG PHY on either side of the connection. In this example, the Type-M to Type-M cable would not physically have any wires connecting the TMDS clock, data, and control bus lines. However, one end of the cable would have its control bus pin shorted to GND, in the manner of a USB-OTG cable. Further, in this example the HDMI-M transmitter chip should provide an ID output to the USB PHY. This output would normally be driven high, even in low-power state. In an embodiment, the HDMI-M receiving chip does not need to provide an ID output to the USB PHY on the receiver side because the receiver device will always be configured as a host.

In some embodiments, the control bus is bi-directional and either device may gain control of the control bus for transmission. In an embodiment, the control bus may be implemented such that either device will obtain control if the other device is not competing, and such that one of the devices (generally the transmitter) will win the arbitration if both devices attempt to gain control of the control bus at approximately the same time.

In some embodiments, a potential initiator must first check if the line is busy. If the control bus has been idle (remaining high, in an example) for a certain time period the device may start arbitration. In one example, data transmission may be required to start from 6 to 9 bit times after arbitration is won. The initiator will start sending packets of data, each packet followed by an acknowledge (ACK) from the follower. Arbitration is needed if the bus has been idle for over a certain number of cycles.

In one implementation, to arbitrate, a transmitting device drives the bus low for 4 bit times. In contrast, a receiving device should drive the bus low for the $1^{st}$ bit time and high for the $2^{nd}$, $3^{rd}$, and $4^{th}$ bit times. In one implementation, to reduce the electrical contention between high and low driven simultaneously on the control bus by two devices, "drive high" refers to driving a signal high for a short time at the beginning of a bit time and then releasing the bus. In this implementation, the pull up resister on the control bus acts to pull up and maintain the high signal level unless there is a signal driven low by the other device on the bus. The receiver checks the state of the bus during the $2^{nd}$, $3^{rd}$ and $4^{th}$ bit times. Because the receiver drives high for a short time at the start of each bit time and then releases the bus, the bus becomes low if the transmitter drives the bus low to obtain the bus. If the receiver detects that the bus is low during the any of these bit times the receiver can conclude that it has lost the arbitration. The receiver and transmitter bit times can differ by a factor of 2 from each other, which is the reason for requiring the transmitter to drive the bus low for 4 bit times. If the transmitter is two times faster than the receiver, the receiver would still see the bus stay low during the $2^{nd}$ bit time.

In an embodiment, an initiator, after winning arbitration, should wait no more than a certain period (a maximum of 9 bit times) to send the SYNC pulse. If the follower does not see any activity for the time period (18 bit times after the end of arbitration, assuming the clocks could be up to two times different from each other) follower can assume that the initiator has given up the bus.

In an embodiment, if the transmitter and receiver arbitrate at about the same time, the transmitter always wins the arbitration. However, each side may be guaranteed to obtain the control bus in time if a limit on the number of packets one side can send before allowing the other side to take control of the bus (such as a maximum packet count of 24) is implemented. In an embodiment, this is a link-layer feature and is independent of any flow control that may be implemented in the translation layer.

In an embodiment, once an initiator completes a transaction, the initiator does not attempt a new transaction for a certain period, such as a time period of 6 bit times. This time period is utilized to allow the follower enough time for the follower to claim the bus for it is own transaction and became the initiator. In this example, the follower may be allowed to start a transaction 3 bit times after the final ACK. If it does so, it gains control of the bus and can send up to 24 packets. If the follower does not start a transaction within 6 bit times after the final ACK, the initiator can recover the bus and start its next set of 24 transactions beginning at the $6^{th}$ bit time. If neither the initiator nor the follower starts a transaction within 9 bit times after the final ACK, the bus becomes inactive. If the bus is inactive, either side needs to arbitrate to gain control of it. Because the initiator and the follower have timebases that may be different by a factor of 2×, during a bus turn-around the follower may be required to maintain its calibration to the timebase of the initiator for 9 bit times, until and unless it takes control of the bus in the $3^{rd}$ bit time.

In some embodiments, devices connected via a control bus engage in calibration using the control bus. In some embodiments the frequencies of the receiver and transmitter oscillator clocks may be vary by as much as two times, and thus a method of calibrating the follower's bit time based on the initiator may be implemented. The calibration is provided so that the following device is capable of sampling the received data at the appropriate point in the bit time.

In some embodiments, a sync pulse from the initiating device, such as the sync pulse provided at the beginning of a data packet, is used by the follower to calibrate the follower's bit time to the initiator. In some embodiments, this calibration may be updated at every subsequent transition on the control bus. In some embodiments, the sync pulse could have more than one bit time in order to increase calibration accuracy.

In some embodiments, because the duty cycle on a control bus (which may be engaged in bi-phase mark encoding) may tend to be skewed away from 50%, the follower may maintain separate calibrations for the high time and low time of the sync pulse. The edge timings may move due to spread-spectrum variation, and thus the follower may be required to average out these variations through use of the separate high and low signals.

Figure 1:
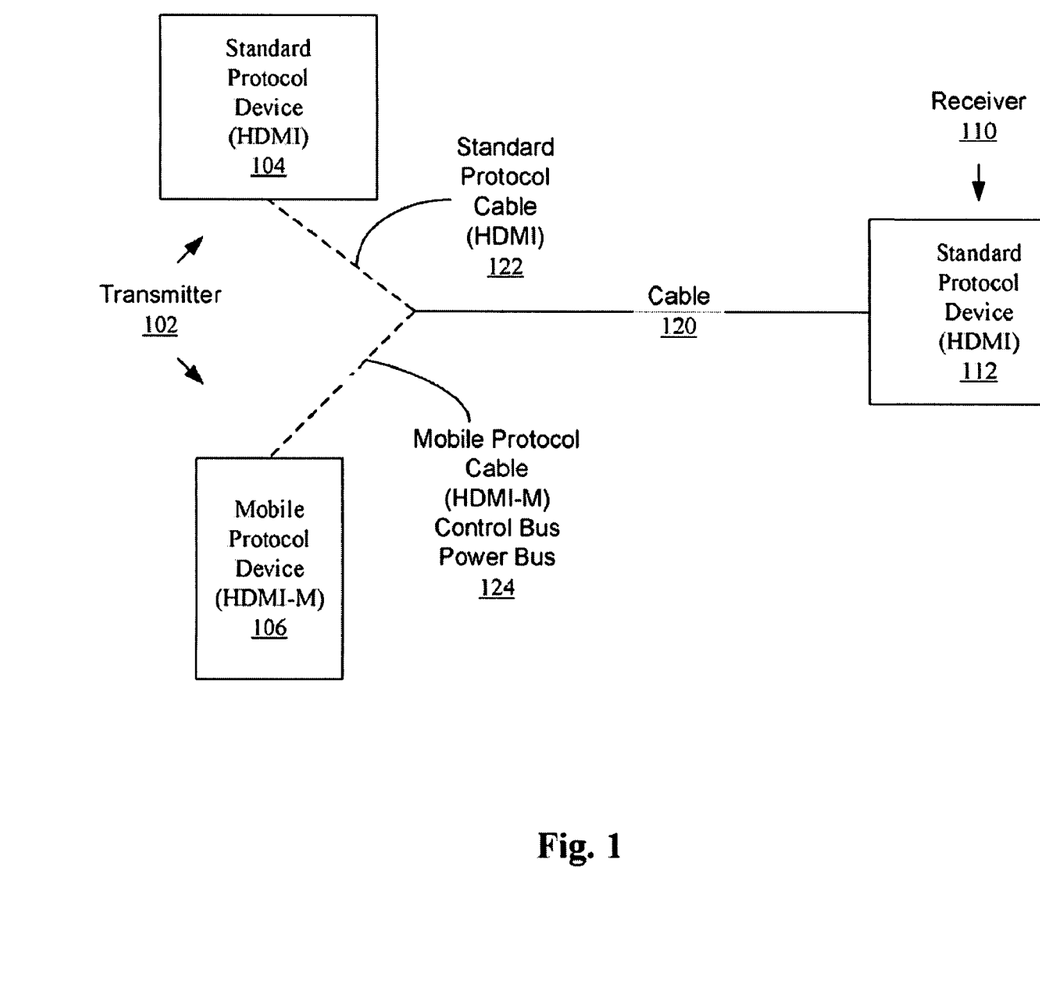
FIG. 1 is an illustration of an embodiment of a transmitting device coupled with a receiving device.

FIG. 1 is an illustration of an embodiment of a transmitting device coupled with a receiving device. In this illustration, a transmitter 102 is coupled to a receiver 110 via a cable 120. In this illustration, the receiver 110 may be a standard protocol device 112, which may include a dual mode HDMI receiving device. In some embodiments, the dual mode HDMI receiving device would be capable of communicating with both an HDMI transmitter and an HDMI-M transmitter. In some embodiments, the transmitter 102 may be one of multiple types of devices. In this illustration the transmitter may be a first type of transmitting device, shown as a standard protocol device 104, such as a HDMI transmitting device, or a second type of device, which is shown as a mobile protocol device 106. The mobile protocol device 106 may be an HDMI-M transmitting device, such as handheld or other mobile media device. In some embodiments, the cable 120 may be either a standard protocol cable 122 for the connection of protocol devices (such as an HDMI compatible cable), or a mobile protocol cable 124 (such as an HDMI-M compatible cable), including a single control cable and a power cable. In some embodiments, the receiver 110 utilizes the signals received on the cable 120 to discover a connection with the transmitter 102, and the transmitter utilizes the signals on the cable 120 to assist in establishing a connection, such as a hot plug connection, with the receiver 110.

In a particular implementation, a control bus may have an operating frequency of 1 MHz to enable transmission of multiple HDMI protocols. In the implementation, the control bus may include control of internal registers, providing reading and writing capability. For HDMI, the control bus provides a bridge to the DDC I2C interface and a bridge to the CEC interface, and is expandable to other future protocols. In an embodiment, the control bus may be able to work while the rest of the system is in power down mode. Because of the cooperative operations between the transmitter and the receiver, the system does not require calibration or interruption of the outside micro-controller, and utilizes a ring oscillator or external clock for timing. The system does not need to maintain bit-accurate timing for either DDC or CEC protocols.

Figure 2:
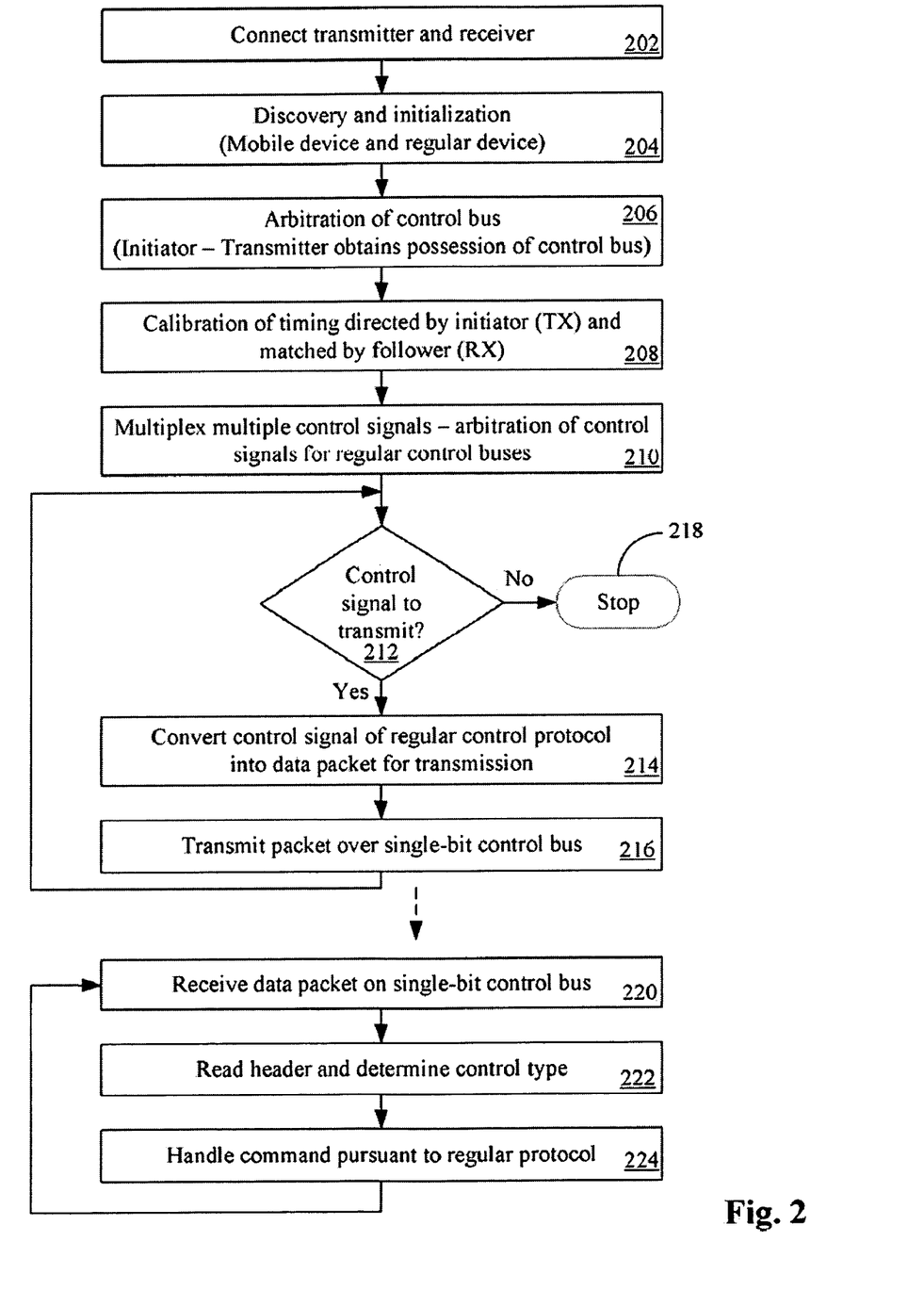
FIG. 2 is a flowchart to illustrate an embodiment of a process for providing control signals between a transmitting device and a receiving device.

FIG. 2 is a flowchart to illustrate an embodiment of a process for providing control signals between a transmitting device and a receiving device. In this illustration, a transmitter and a receiver are connected together 202. In some embodiments, the transmitter is a mobile protocol device and the receiver is a standard protocol device. The receiver may be a dual-mode device that is capable of communicating with both a standard protocol device and a mobile protocol device. In a particular embodiment, the transmitter is an HDMI-M protocol device, and the receiver is an HDMI protocol device. The transmitter and receiver are connected by a mobile protocol cable, such as a HDMI-M compatible cable. In an embodiment, the transmitter and receiver utilize a bi-directional, single-bit control bus. In an embodiment, the control bus is a bus utilizing bi-phase mark encoding.

In an embodiment, the transmitter and receiver engage in a discovery/hot plug process to identify each other, and initialize communication 204. In this instance, there is a determination that the receiving device is connected with a mobile device, and thus is utilizing a bi-directional, single-bit control bus. In an embodiment, the transmitter and receiver engage in an arbitration process to determine the ownership of the bus. The arbitration process may be the arbitration process illustrated in FIG. 3. In this instance, the transmitter wins the arbitration, and is the initiator of the transaction. In an embodiment, the transmitter, as initiator, provides a signal to the receiver to calibrate the clocks of the transmitter and receiver 208.

Figure 8:
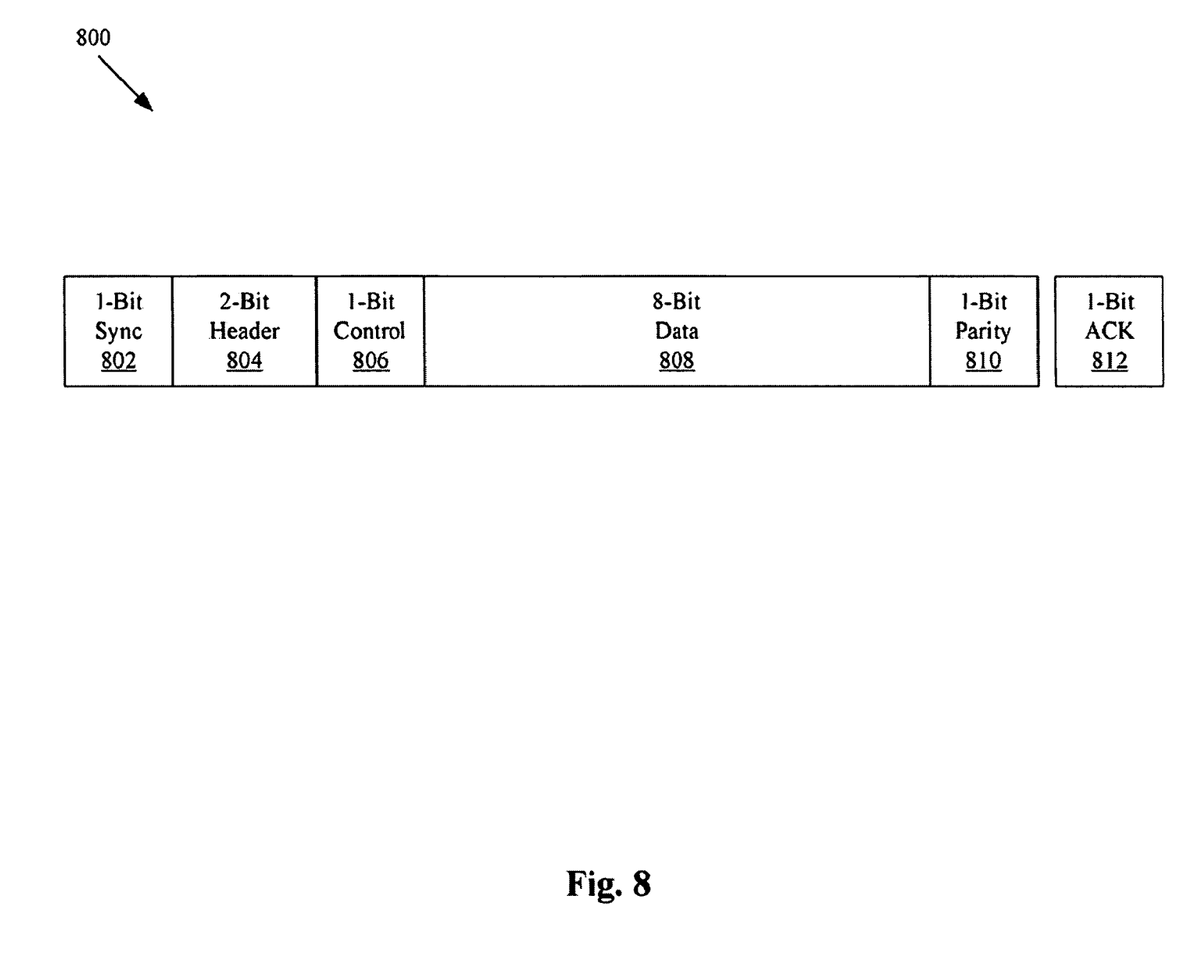
FIG. 8 illustrates an embodiment of a data packet for transfer of control data.

In some embodiments, multiple control signals are multiplexed onto the control bus 210. In an embodiment, the multiple control signals are subjected to an arbitration process to determine which control signal is placed on the control bus. In some embodiments, the control signals are converted from bytes of data to data packets that identify the type of data within each packet. In one particular example, HDMI control signals are multiplexed together on the control bus on a byte by byte basis. For example, CEC, DDC, and private channel instructions are multiplexed together on the control bus. If there is a control signal to be transmitted 212, the signal is converted into a data packet for transmission. In an embodiment, the data packet may be a data packet as shown in FIG. 8. The data packet is then transmitted from the transmitter to the receiver over the single-bit control bus 216. The process may continue as long as the transmitter has control signals to transmit, with the process then stopping 218.

For the receiver, one or more data packets containing command data may be received on the single-bit control bus 220. The receiver will read the header of each received data packet and determine the control type 222, and will handle each command as required under the standard protocol 224, such as, for example, HDMI.

Figure 3:
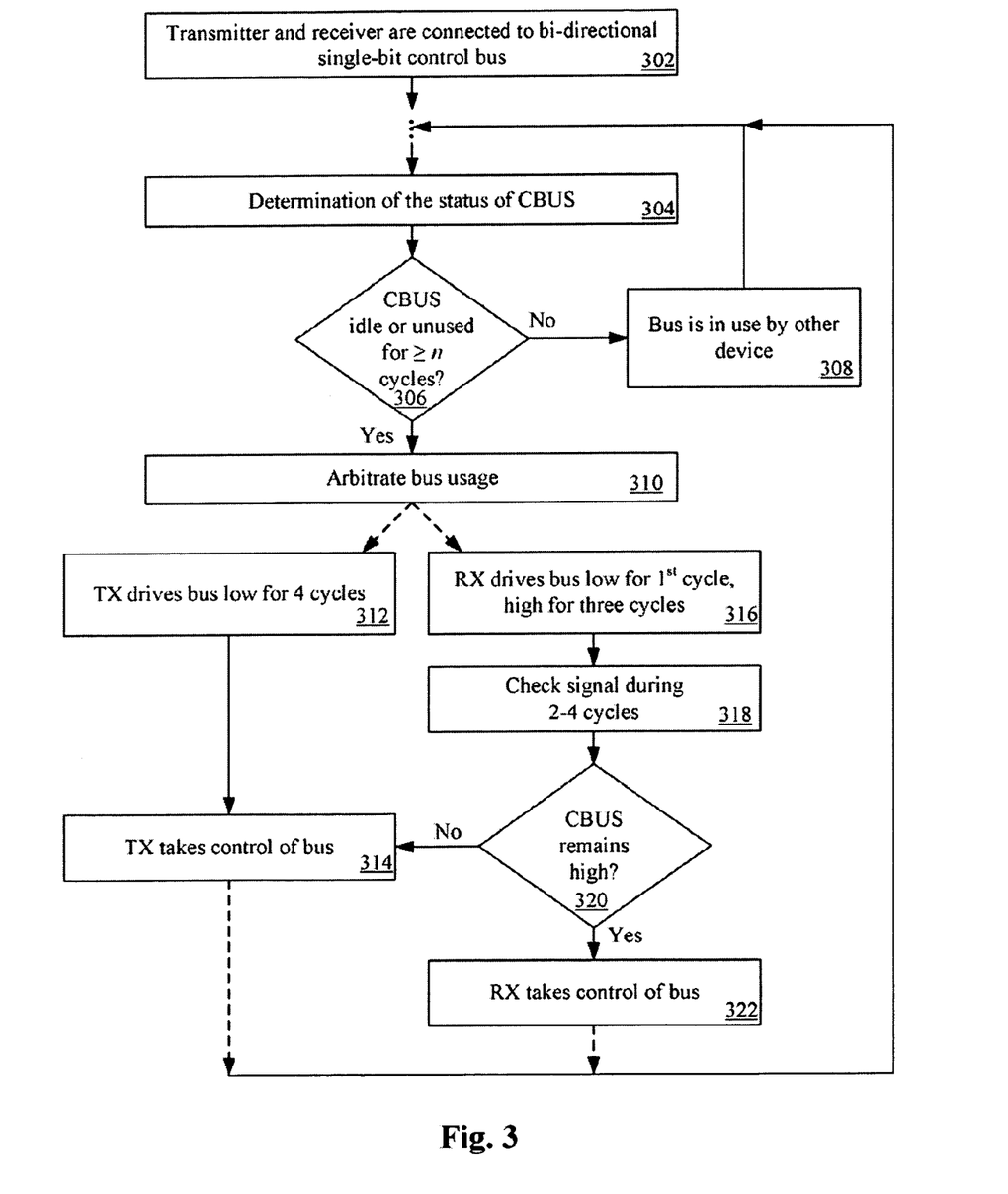
FIG. 3 is an illustration of an arbitration process for a bi-directional, single-bit control bus.

FIG. 3 is an illustration of an arbitration process for a bi-directional, single-bit control bus. A transmitter and receiver are connected, with the connection including a bi-directional, single-bit bus 302. At some point in operation, either or both of the devices may wish to take control of the bus. In this process, there is determination of the status of the control bus 304. If it is determined that the CBUS is idle (having been unused for a certain number of cycles) or has been unused by the other device for a certain number of cycles (indicating that it is the device's turn to utilize the control bus) 306, then the use of the bus may be arbitrated 310. Otherwise, the device may determine that the control bus is in use by the other device 308. In an embodiment, if the transmitter and receiver seek to control the bus at approximately the same time, the transmitter will win the arbitration. If the transmitter seeks to control the bus, the transmitter will drive the bus low for a certain number of cycles (four cycles, in this example) 312, which will provide notice to the receiver that the transmitter is seeking control of the bus. The transmitter will then take control of the bus 314. If the receiver seeks control of the bus, then the receiver will drive the bus low for a cycle, and then drive the bus high for a short pulse 316. If the transmitter is not driving the bus, then the signal will stay high, and if the transmitter is driving the bus low the signal will go low. Based on this behavior, the receiver will check the signal on the CBUS during a certain period (during the second through fourth cycles in an example) 318. If the signal has remained high, this is an indication that the transmitter is not seeking control of the bus, and the receiver will take control 322. If the signal does not remain high, this is an indication that the transmitter is driving the signal low and is seeking control of the bus, and the transmitter again will take control 314.

Figure 4:
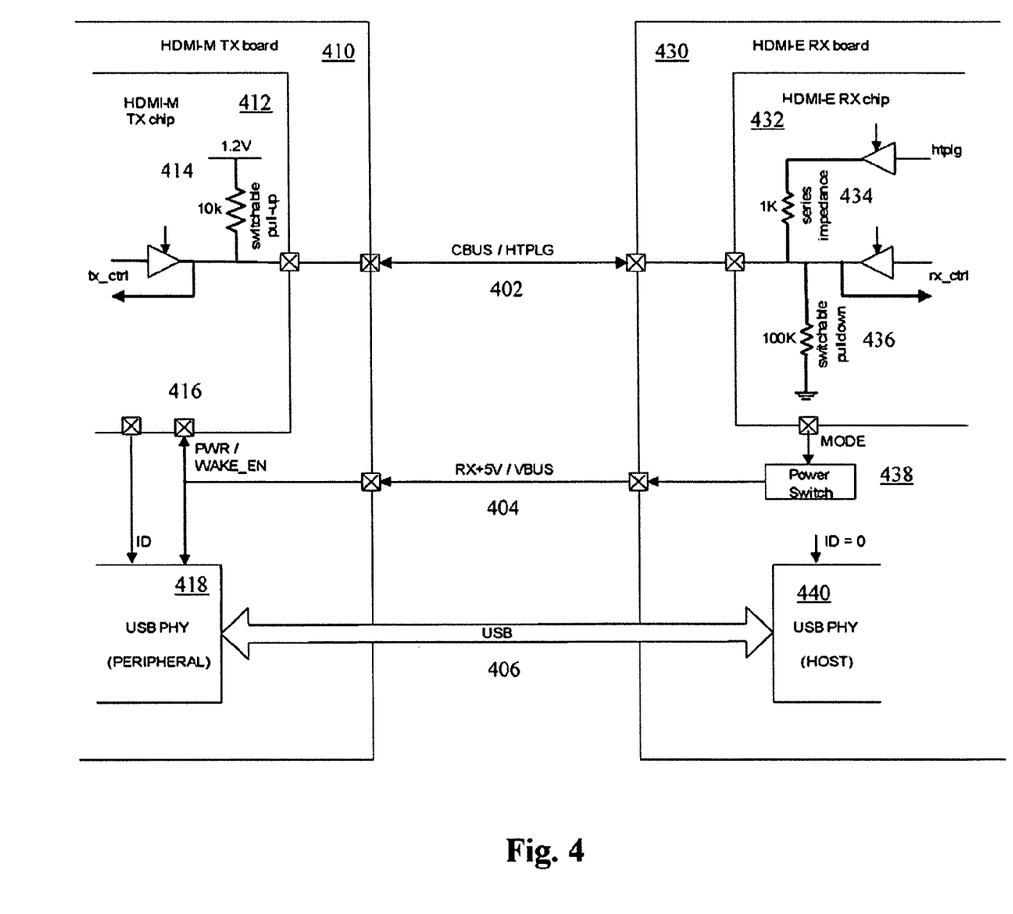
FIG. 4 is an illustration of an embodiment of a mobile device coupled with a standard device via a control bus.

FIG. 4 is an illustration of an embodiment of a mobile device coupled with a standard device via a control bus. In this illustration, a mobile HDMI transmitting device (HDMI-M TX board 410) is coupled with a dual-mode HDMI receiving device (HDMI-E RX board 430). The devices are coupled via a control bus/hot plug 402 (referred to herein as the CBUS), a 5 volt power source VBUS provided by the receiver 430 to the transmitter 410, and a USB connection 406. In some embodiments, the transmitter has a switchable pull-up circuit 414 (illustrated as part of the HDMI-M transmitter chip 412) and the receiver has a switchable pull-down circuit 436 (illustrated as part of the HDMI-E receiver chip 432) on the CBUS. Also illustrated is a series impedance 434 of receiver 430. The VBUS 404 is connected between a power/wake enable node 416 for the transmitter 410 and a power switch 438 for the receiver 430. The USB bus 406 is connected between a USB PHY (physical layer) 418 for the transmitter 410 and a USB PHY 440 for the receiver 430.

Figure 5:
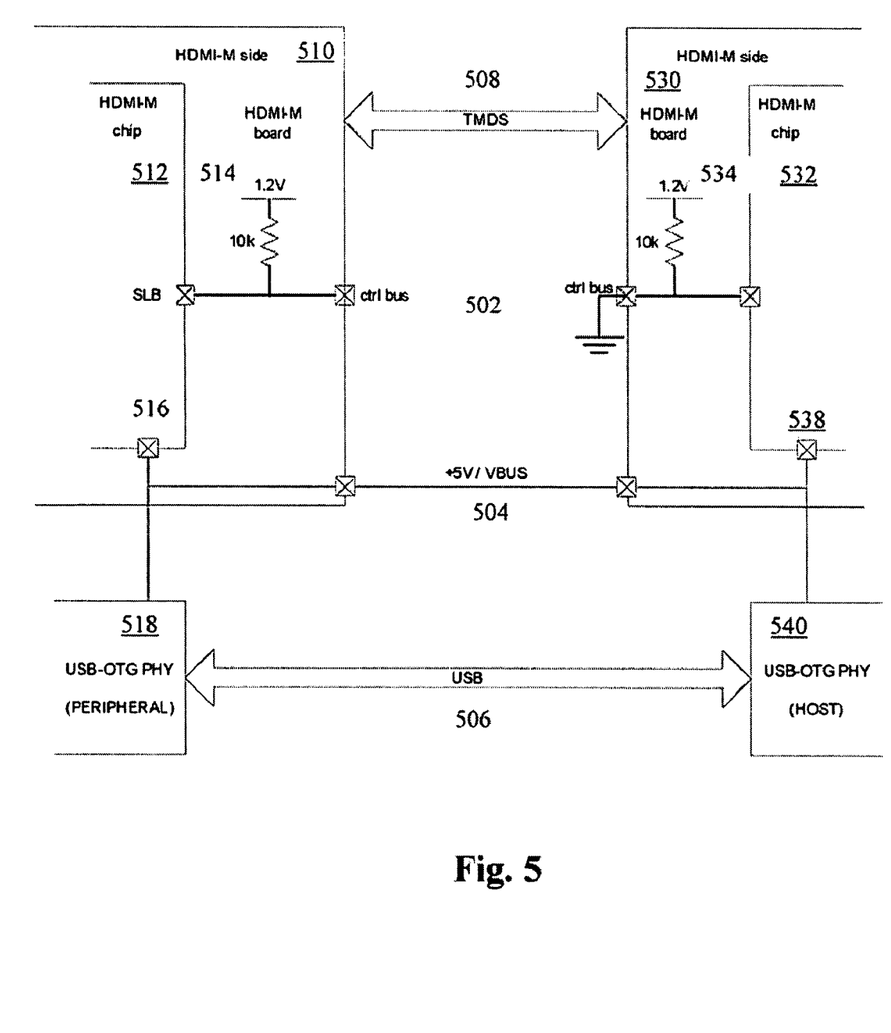
FIG. 5 is an illustration of an embodiment of a connection between two mobile devices.

In an embodiment of the invention, the CBUS 402 is a bi-directional, single-bit control bus. In an embodiment, the CBUS operates utilizing bi-phase mark encoding. The CBUS is utilized to transport multiple different types of control signals between the transmitter 410 and the receiver 430, the control signals being multiplexed together for transmission. In an embodiment, either the transmitter 410 or the receiver 430 may take control of the CBUS 402, with the control of the CBUS being established by an arbitration process FIG. 5 is an illustration of an embodiment of a connection between two mobile devices. In this illustration, a first mobile device 510 (a first HDMI-M side) may be connected to a second mobile device 530 (a second HDMI-M side). As these are mobile devices, both devices include a pull-up circuit 514 and 534. The devices are connected via a VBUS 504, which is not powered, and a USB connection 506. The devices may further include a TMDS (Transition Minimized Differential Signaling) bus 508. The USB bus 506 connects a first USB PHY 518 to a second USB PHY 540. However, the connection of the two mobile devices results in a disconnected control bus.

Figure 6:
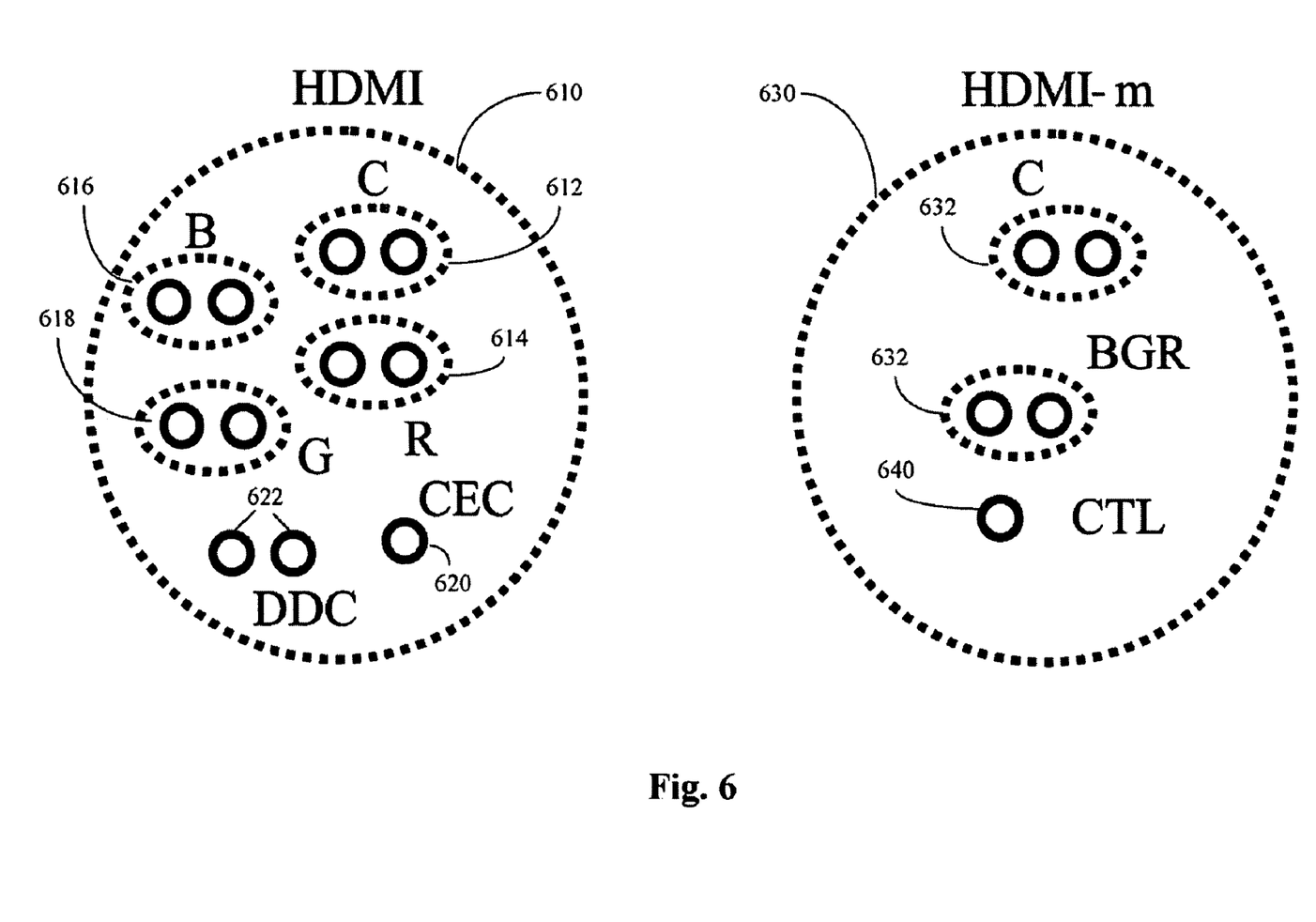
FIG. 6 illustrates an embodiment of a cable that may be utilized to connect a transmitter and a receiver.

FIG. 6 illustrates an embodiment of a cable that may be utilized to connect a transmitter and a receiver. In this example, an HDMI cable 610 may include a clock channel, three data channels (Blue 616, Green 618, and Red 614), a DDC channel 622 (the DDC channel having two wires), and a CEC channel 620 (the CEC channel having a single wire). (The cable may include other lines, such as a +5V power signal line, a hot plug detect, and a USB data channel, which are not illustrated here.) However, in some embodiments the HDMI-M cable may utilize fewer lines because of the smaller device size, including a clock channel 632, a merged data channel 632, and a single-bit control channel 640. In some embodiments, the single-bit control channel is a bi-directional channel that is operated at an increased speed to include merged control data from both a transmitter and a receiver.

Figure 7:
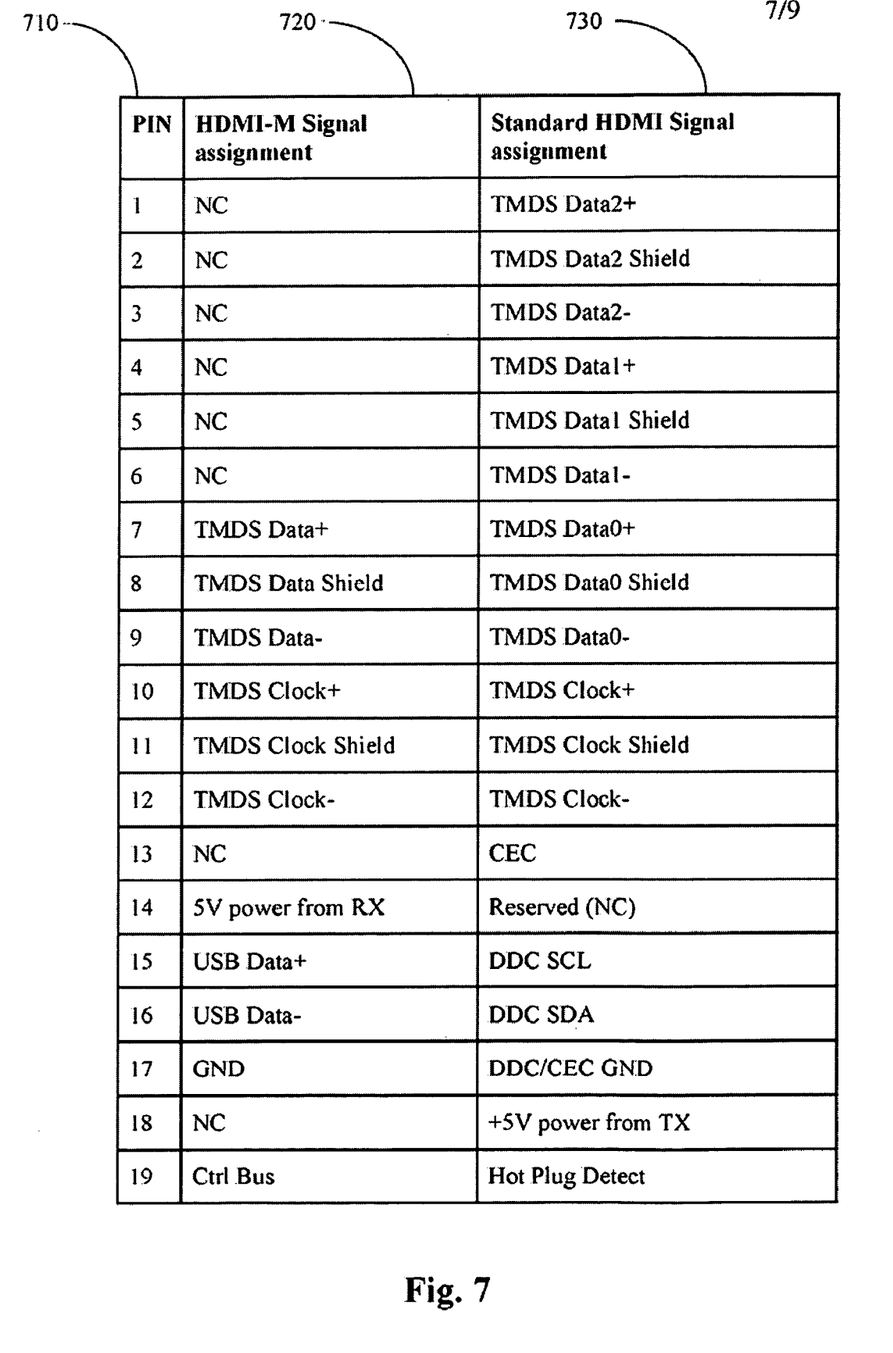
FIG. 7 is an illustration of an embodiment of cable signal assignments for transmitter and receiver.

FIG. 7 is an illustration of an embodiment of cable signal assignments for transmitter and receiver. FIG. 7 illustrates a particular example of a cable connection implementation. In an embodiment, the assignments show the pins 710 for an HDMI-M device 720 that is connected to an HDMI device 730. In an embodiment, the HDMI device is a dual-mode device that is capable of communicating with both a standard HDMI device and an HDMI-M device. In this example, two of the data channels of the HDMI device 730 are not connected to HDMI-M device (pins 1-6), and thus the data is carried over the one data channel (pins 7-9). Further, the control data that would be transported via the DDC (pins 15-17, which lines are used for USB data) and CEC data are carried over the control bus (pin 19, which is used with the hot plug detect of the HDMI device)

FIG. 8 illustrates an embodiment of a data packet for transfer of control data. In an embodiment, control data from multiple sources is merged or multiplexed onto a single-bit control bus. In an embodiment, control data bytes are formed into data packets for transfer on the control bus. In an example, the data packet may be data packet 800. The fields contained in data packet 800 may vary in different embodiments. In this example, data packet 802 includes a 1-bit sync signal 802, followed by a 2-bit header 804 to indicate the type of data packet contained in the data packet 800 and a 1-bit control field 806 to indicate whether the data packet contains data or a command. The numbers of bits included in each field may vary in different implementations. In one example, the sync signal 802 may include more than one bit in order to increase calibration accuracy.

Figure 9:
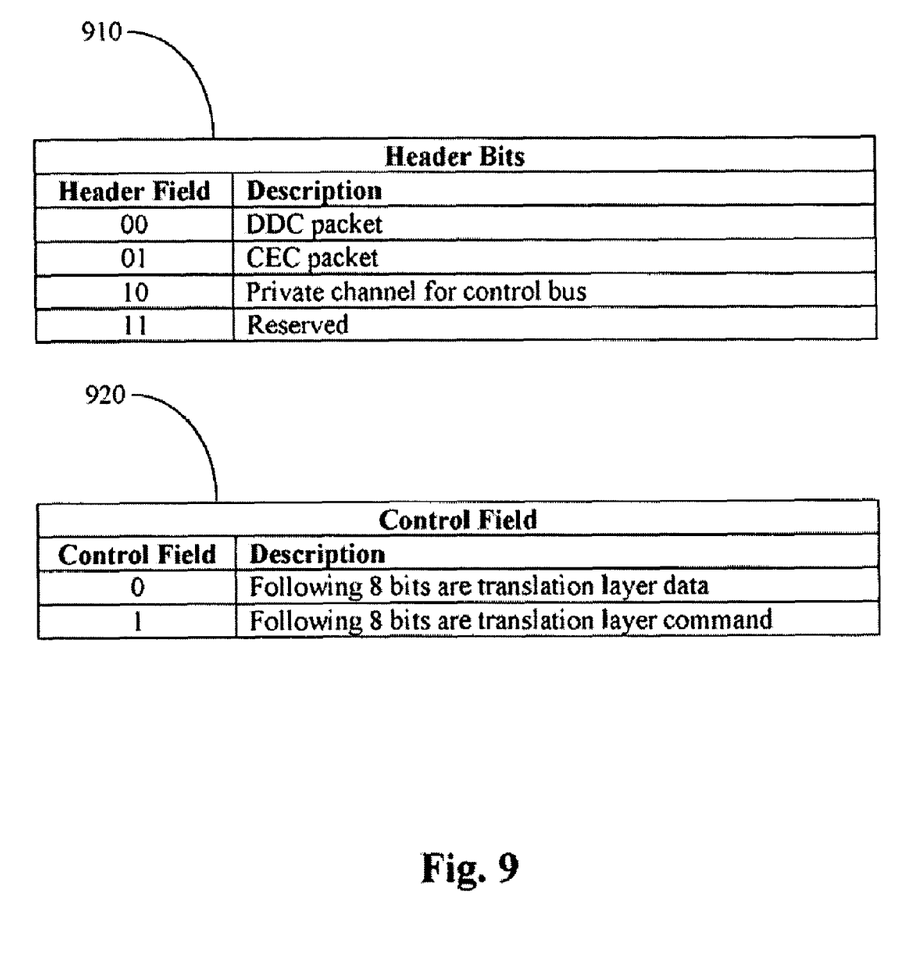
FIG. 9 is an illustration of the header and control fields utilized in an embodiment of a control data packet.

The header 804 and control field 806 may, for example, be encoded as provided in FIG. 9. The control field is followed by 8 bits of translation layer data or command 808. Following the data 808 is a parity bit 810. The parity covers both the header and the data, and even parity is used. The use of even parity then ensures that the bus has transitioned to a high level prior to start of an acknowledge ACK 812.

Thus, in an embodiment, a packet starts from a high state for the control bus (indicating an idle bus) with a sync pulse, and the control bus ends in a high state with an ACK. Aside from these two bits, there should be an even number of O's in the packet in order for the bus level to end up at a high state at the end. (In bi-phase mark encoding, as used here, the bus level at the end of a '1' is the same as that at the beginning; the bus level at the end of a '0' is the opposite of that at the beginning.) Because there is an even number of bits, an even number of '1's are needed, and thus even parity.

FIG. 9 is an illustration of the header and control fields utilized in an embodiment of a control data packet. In a data packet carrying control data, such as the data packet 800 illustrated in FIG. 8, two bits of a header 910 may be utilized to indicate whether the data packet includes a DDC packet (header field '00'), a CEC packet (header field '01'), or private channel data for the control bus (header field '10'). In this illustration, header field '11' is reserved for future uses. Further, a bit of a control field 920 may be utilized to indicate that the data bits (such as data 808 illustrated in FIG. 8) represent translation layer data (control field '0') or a translation layer command (control field '1').

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:

coupling a first device to a second device, the first device being one of a transmitting device or a receiving device and the second device being the other of a transmitting device or a receiving device, coupling of the first and second devices including connecting a first control bus between the first device and the second device, the first control bus being a bi-directional, single-line bus;

determining whether the first control bus is in use by the second device;

if the first control bus is not in use by the second device, conducting arbitration for control of the first control bus; and if the first device obtains control of the first control bus through the arbitration for control of the first control bus, the first device becoming an initiator and the second device becoming a follower, then further comprising:

converting one or more control signals for a standard protocol to one or more data packets, each of the one or more control signals representing one of a plurality of different types of control signals, each data packet including a plurality of bits to be transmitted; and transmitting the generated data packets from the first device to the second device via the first control bus, and wherein the receiving device is a device utilizing the standard protocol and the transmitting device is a mobile device utilizing a modified protocol, the modified protocol being a modification of the standard protocol that is not included in the standard protocol.

2. The method of claim 1, wherein the signaling for transmitting the one or more generated data packets on the first control bus utilizes bi-phase mark encoding.

3. The method of claim 1, wherein if the second device obtains control of the first control bus, the second device becoming the initiator and the first device becoming the follower, then further comprising:

receiving at the first device the plurality of data packets transmitted from the second device.

4. The method of claim 1, wherein, if the first device is a transmitting device for transmission of data to the second device, then arbitrating for control of the first control bus includes:

determining the first control bus is idle or unused for a first time period;

if the first control bus is idle or unused for the first time period, then sending a low signal for a first number of cycles; and after the conclusion of the first number of cycles, then taking control of the first control bus.

5. The method of claim 1, wherein, if the first device is a receiving device for reception of data from the second device, then arbitrating for control of the first control bus includes:

determining the first control bus is idle or unused for a first time period;

if the first control bus is idle or unused for the first time period, then sending a low signal followed by a high signal for a first number of cycles;

during the first number of cycles, checking a status of the first control bus;

if the status of the first control bus is a high signal, taking control of the first control bus.

6. The method of claim 1, wherein the standard protocol is HDMI (High-Definition Multimedia Interface).

7. The method of claim 1, wherein the receiving device is a dual-mode device that is capable of communicating with a device that is compatible with the standard protocol or a device that is compatible with the modified protocol.

8. The method of claim 1, wherein standard protocol requires that the plurality of different types of control signals be transmitted over a plurality of different control buses.

9. The method of claim 1, wherein the transmission of a data packet by the initiating device is followed by an acknowledge (ACK) message from the following device to the initiating device on the first control line.

10. The method of claim 9, wherein the initiating device transmits a second data packet after receipt of the ACK message from the following device.

11. The method of claim 1, wherein generating each data packet includes generating a header for each data packet to indicate a type of control signal represented by the data packet.

12. A transmitting device comprising:

a connection to a single first control bus, the first control bus being a bi-directional, single-line bus, wherein the transmitting device is operable for coupling with a receiving device via the first control bus;

logic to convert each of one or more control signals into a data packet, each of the one or more control signals being one of a plurality of different types of control signals for a standard protocol, each data packet including a plurality of bits to be transmitted;

a transmitter, the transmitter to transmit the data packets to the receiving device on the first control bus; and logic to arbitrate use of the first control bus, the logic to arbitrate use being operable to:

determine whether the control bus is in use by the receiving device, and if the first control bus is not in use by the receiving device, conduct arbitration for control of the first control bus, and wherein the receiving device is a device utilizing the standard protocol and the transmitting device is a mobile device utilizing a modified protocol, the modified protocol being a modification of the standard protocol that is not included in the standard protocol.

13. The transmitting device of claim 12, wherein the transmitter is to drive the first control bus in a bi-phase mark signaling manner.

14. The transmitting device of claim 12, wherein transmitting the one or more data packets on the first control bus includes transmitting a sync pulse to the receiving device at the beginning of each data packet to synchronize a clock of the receiving device to a clock of the transmitting device.

15. The transmitting device of claim 12, further comprising a switchable pull-up circuit coupled with the first control bus.

16. The transmitting device of claim 12, wherein the standard protocol is HDMI (High-Definition Multimedia Interface).

17. The transmitting device of claim 12, further comprising a USB-OTG (Universal Serial Bus On-The-Go) PHY (physical layer).

18. The transmitting device of claim 12, wherein the logic to arbitrate use of the first control bus is further operable to take control of the first control bus if the transmitting device and the receiving device arbitrate use of the first control bus at the same time.

19. A receiving device comprising:
   a connection to a single first control bus, the first control bus being a bi-directional, single-line bus, wherein the receiving device is operable for coupling with a transmitting device via the first control bus;
   a receiver to receive one or more data packets on the first control bus, each of the one or more data packets representing one of a plurality of different types of control signals;
   logic to convert each of the one or more data packets into a control signal; and
   logic to arbitrate use of the first control bus, the logic to arbitrate use being operable to:
      determine whether the control bus is in use by the transmitting device, and
      if the first control bus is not in use by the transmitting device, conduct arbitration for control of the first control bus, and wherein the receiving device is a device utilizing the standard protocol and the transmitting device is a mobile device utilizing a modified protocol, the modified protocol being a modification of the standard protocol that is not included in the standard protocol.

20. The receiving device of claim 19, wherein the receiver is operable to decode the one or more received data packets according to bi-phase mark encoding.

21. The receiving device of claim 19, wherein the receiver is operable to receive a sync pulse from the transmitting device on the first control line, the receiving device to synchronize a clock of the receiving device to a clock of the transmitting device.

22. The receiving device of claim 19, further comprising a switchable pull-down circuit coupled with the first control bus.

23. The receiving device of claim 19, wherein the standard protocol is HDMI (High-Definition Multimedia Interface).

24. The receiving device of claim 19, wherein the receiving device is a dual-mode device that is capable of communicating with a device utilizing the standard protocol or a device utilizing the modified protocol.

25. The receiving device of claim 19, wherein the logic to arbitrate use of the first control bus is further operable to allow the transmitting device to take control of the first control bus if the transmitting device and the receiving device arbitrate use of the first control bus at the same time.

* * * * *